C. E. Storrs, W. E. Keyes & D. W. Jones. Cultivator

No. 72560

PATENTED
DEC 24 1867

Witnesses.
Theo. Tusche
W. Trewin

Inventor:
C. E. Storrs
W. E. Keyes
D. W. Jones
Per Munn & Co.
Attorneys

UNITED STATES PATENT OFFICE.

CHARLES E. STORRS, W. E. KEYES, AND DAVID W. JONES, OF GRANDVILLE, MICHIGAN.

IMPROVEMENT IN CULTIVATORS.

Specification forming part of Letters Patent No. 72,560, dated December 24, 1867.

*To all whom it may concern:*

Be it known that we, CHARLES E. STORRS, WILLIAM E. KEYES, and DAVID W. JONES, of Grandville, in the county of Kent and State of Michigan, have invented a new and Improved Cultivator; and we do hereby declare that the following is a full, clear, and exact description thereof, which will enable those skilled in the art to make and use the same, reference being had to the accompanying drawings, forming part of this specification, in which—

Figure 1:
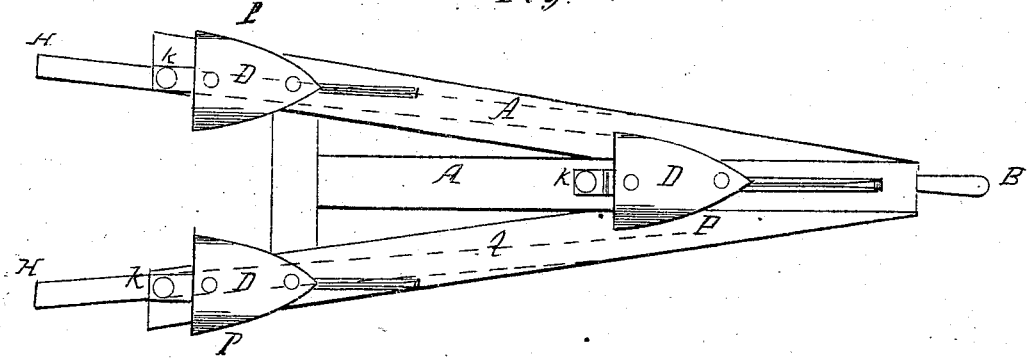
Figure 3:
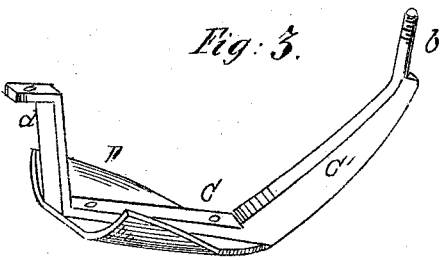
Figure 2:
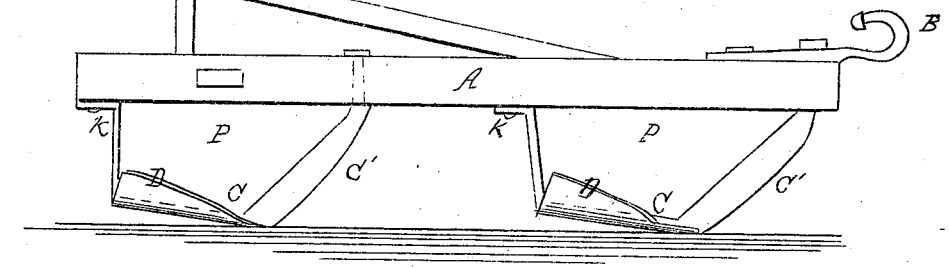

Figure 1 is a bottom view of our cultivator. Fig. 2 is a side elevation of the same. Fig. 3 is a perspective view of the plow.

Similar letters of reference indicate corresponding parts.

This invention consists in forming a cultivator-plow with its sides curved upward, resembling a scoop, and provided with a cutting-edge to facilitate its passage through the soil, the whole attached to a frame.

In Figs. 1 and 2, A A A is a V-shaped frame with the plows P P P bolted through it, as shown. The frame is provided with handles H, attached to its upper surface in the usual manner.

B is the hook for hitching to the draft-animals.

The plows are formed of a curved surface, somewhat in the form of a scoop, as shown at D, Fig. 3, riveted, bolted, or otherwise secured to an iron, C. The scoop D may be of any suitable metal. Its lateral edges are sharpened or beveled for cutting the soil, and in practice its best shape would be that approaching a triangle. The iron C, to which the scoop is attached, has its front part, C', turned up at angle and sharpened, thus presenting a cutting-edge or colter, which divides the soil and facilitates the passage of the scoop through it. The point of the scoop is immediately at the lower extremity of this cutting-edge, which latter may be made of steel and welded to the iron, if preferable, or the whole may be of steel. The upper end of the colter C' is drawn to a shank, $b$, for bolting through the frame of the cultivator. The rear part, $d$, of the iron is bent horizontal at its top, and perforated for a spike or wood-screw, whereby it is secured to the said frame A, as shown at $k$.

In practice the scoops D are not horizontal or parallel with the frame and its line of motion, but are more or less inclined, with their points downward. This enables them to counteract the tendency of the colters C' to rise out of the soil, and holds both the colters and scoops well down into the same when drawn forward. The rear end of the scoops being correspondingly elevated, the soil is lifted and broken as it is delivered from them.

The advantages possessed by this form of cultivator consist in its light draft, the thoroughness with which it loosens up the soil, its simplicity, and cheapness.

We claim as new and desire to secure by Letters Patent—

1. The scoop-shaped plows D, for cultivators, substantially as and for the purpose shown and described.

2. A scoop-shaped cultivator-plow, D, secured to and forming part of a colter or cutting-edge, C', substantially as and for the purpose shown and described.

3. The plows D, in combination with the V-shaped frame, substantially as and for the purposes shown and described.

CHAS. E. STORRS.
WILLIAM E. KEYES.
DAVID W. JONES.

Witnesses:
SILAS POWELL,
JOHN LATTA.